United States Patent [19]

Moxon

[11] Patent Number: 4,639,792

[45] Date of Patent: * Jan. 27, 1987

[54] APPARATUS FOR DECODING VIDEO ADDRESS CODE SIGNALS

[75] Inventor: Edwin C. Moxon, Boxboro, Mass.

[73] Assignee: The Stypher Corporation, Hudson, Mass.

[ * ] Notice: The portion of the term of this patent subsequent to May 7, 2002 has been disclaimed.

[21] Appl. No.: 729,652

[22] Filed: May 2, 1985

Related U.S. Application Data

[63] Continuation of Ser. No. 435,689, Oct. 21, 1982, Pat. No. 4,516,164.

[51] Int. Cl.[4] .................................... H04N 5/782
[52] U.S. Cl. ................................ 358/335; 358/336; 358/340; 360/39; 360/33.1; 360/49; 360/53; 360/72.2; 369/59; 369/60
[58] Field of Search ............... 360/9.1, 13, 14.1, 14.3, 360/14.2, 36.1, 36.2, 39, 49, 53, 72.2, 33.1; 371/30; 369/59, 60; 358/335, 336, 340

[56] References Cited

U.S. PATENT DOCUMENTS 3,999,129 12/1976 Kasson .................................. 375/26
4,215,335  7/1980 Doi et al. .............................. 371/69

Primary Examiner—Robert L. Richardson
Attorney, Agent, or Firm—Wolf, Greenfield & Sacks

[57] ABSTRACT

Apparatus for decoding digitally-coded address signals embedded in video signals recorded on magnetic tape is disclosed. The apparatus can properly decode the address signals at both slow and fast tape speeds and utilizes a variable-frequency oscillator to generate timing signals for decoding the digitally-coded address. The address signals encoded on the magnetic tape normally include an error code which can be detected by conventional error checking circuitry and used to check whether the address signals have been correctly received. The oscillator frequency is adjusted in accordance with an error signal generated by the error checking circuitry until error-free detection of the address signals is achieved.

7 Claims, 4 Drawing Figures

APPARATUS FOR DECODING VIDEO ADDRESS CODE SIGNALS

This application is a continuation of application Ser. No. 435,689, filed Oct. 21, 1982 and now U.S. Pat. No. 4,516,164.

FIELD OF THE INVENTION

This invention relates to apparatus for decoding digital address signals encoded with a video signal on video magnetic tape and in particular to apparatus for decoding a vertical interval time code (VITC) recorded on the magnetic tape.

BACKGROUND OF THE INVENTION

In video magnetic tape recorders encoded address information is often periodically recorded along with the video information on the magnetic tape. During subsequent editing of the tape, the encoded information can be read and decoded and the resulting position information used to position the tape precisely within the editing apparatus. To perform editing operations efficiently, it is desirable to have the ability to read the code signals when the tape is moving either at rewind or fast forward speeds so that the coded information can be used to roughly position the tape prior to beginning editing.

There are at least two types of code signals which are in general use at the present time. One of these code signals is a longitudinal time code signal which is recorded longitudinally on the magnetic tape in a separate audio track or cueing track which accompanies the video information.

Another type of time code signal commonly used is known as the vertical interval time code (VITC) signal. In contrast to the SMPTE time code signal, the VITC signal is embedded in the video information and recorded on the video recording track itself rather than an accompanying track. Normally, the VITC signal contains encoded information relating to the relative time at which the corresponding tape location was written and includes hour, minute, second, frame and field information and also a conventional CRC error correcting code which can be used to check for coding and reception errors.

The same VITC signal code is conventionally encoded in two non-adjacent horizontal periods within the vertical blanking interval of each video field. The coded information does not interfere with the reproduced picture because the the video signal is normally blanked during the vertical interval to allow time for the monitor scanning beam to retrace.

The VITC signal is encoded on the magnetic tape at a fixed clock or "bit" rate so that it can be decoded easily during normal editing operations when the tape is moving at normal playback speed or is stopped. It is convenient, however, to be able to decode the VITC signals at fast tape speeds in order to detect relative tape position when the tape is being run in the fast-forward or rewind mode prior to actual editing.

A problem has arisen with some prior art VITC decoding circuitry in that the VITC signal is normally decoded from the composite video signal read from the magnetic tape with circuitry that uses a local oscillator of fixed frequency. In such circuitry, the decoding oscillator is synchronized to the signals read from the tape and used to sample the incoming data stream at the normal playback bit rate. However, in some tape recording formats, the effective bit rate of the signal read from the tape varies with the tape speed over the tape recorder read head. As the tape speed increases, such as during rewind or fast forward motions, the bit rate of the composite signal read from the tape also increases. When the increased bit rate varies significantly from the normal playback bit rate, a decoding circuit which uses a fixed-frequency oscillator to sample the incoming waveform will not satisfactorily decode the signal.

Accordingly, other prior art address decoding circuits were developed which used the VITC signal to generate address information only when the tape was moving at playback speeds or was stopped. At high tape speeds the longitudinal time code was used to check position. These prior art circuits suffered from the difficulty that they required both the VITC signal and the longitudinal code to be recorded on the tape and accordingly required circuitry which could decode both types of signals.

Other prior art arrangements were developed in which the local decoding oscillator frequency is varied in proportion to the tape speed by electronically measuring the tape speed and ajusting the oscillator frequency accordingly. In these systems the tape speed is measured by detecting the time interval occurring between two fixed points on the tape such as the time interval occurring between two horizontal synchronization pulses. These latter systems suffered from additional problems in that they were subject to interference from electrical noise and the circuitry needed to check the tape speed was complex and costly.

It is an object of the present invention to derive a decoding clock rate which can be used to correctly decode the VITC signal when the tape on which the VITC signal is encoded is either stopped or running at slow or fast speeds.

It is another object of the present invention to provide apparatus in which a clock rate for decoding the VITC signal can be derived without using complex circuitry.

It is yet another object of the present invention to provide apparatus which can derive a VITC signal decoding clock rate even in the presence of noise or extraneous signals.

SUMMARY OF THE INVENTION

The foregoing problems are solved and the foregoing objects are achieved in one illustrative embodiment of the invention in which a programmable variable-frequency oscillator is substituted for the normal fixed-frequency oscillator used in a conventional VITC signal decoder. The decoding circuitry initially attempts to decode the VITC signal by adjusting the programmable oscillator to generate an initial "trial" frequency (usually the playback frequency). Standard error detection and correction circuitry is used to monitor the CRC error code which is encoded with the address information in the VITC signal. The output of the error detection circuitry is monitored by a computer which can control the decoding frequency generated by the local oscillator. If the error detection circuitry indicates that the VITC signal has been decoded correctly, using the trial decoding frequency, the trial frequency is selected as the decoding frequency. If the error correction circuitry indicates that the VITC code has been decoded erroneously, the programmable oscillator frequency is changed by the computer to a slightly higher decoding frequency which is used as a second trial decoding frequency. Another decoding error causes the apparatus to choose a third trial decoding frequency slightly lower than the initial trial frequency. A still further error causes the system to try the playback frequency again. Continuing decoding errors cause further adjustment of the programmable oscillator to generate trial decoding frequencies of sequentially higher and lower frequencies (in alternating sequence) interspersed with the playback frequency and the oscillator frequency last known to have produced error-free decoding until the VITC signal is received in an error-free condition.

DETAILED DESCRIPTION OF THE INVENTION

Figure 1:
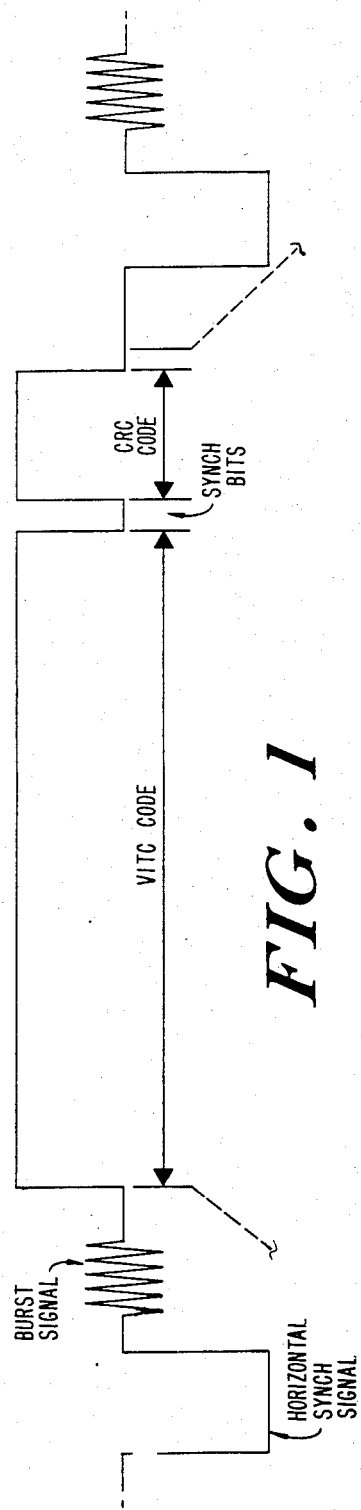
FIG. 1 is an illustrative video waveform showing the location at which a VITC signal is inserted.

FIG. 1 is an electrical waveform showing where the vertical interval time code is inserted into a standard video signal. The VITC code occupies the same space as the normal video signal, that is, it is located above the pedestal voltage and is inserted in the horizontal line directly after the color burst signal so that the first bit of the code begins approximately 10.5 microseconds after the 50% of amplitude point of the leading edge of the horizontal sync pulse.

In accordance with well-known standards, the waveform shown in FIG. 1 is inserted into the vertical blanking interval in two non-adjacent horizontal lines between line 10 and line 20 and occupies the same line numbers for all video fields. The complete VITC code consists of 90 bits which are recorded on the magnetic tape at a bit rate that is a predetermined function of the horizontal line rate. The code specifies a frame location on the tape in terms of an hour count number, a minute count number, a second count number and a frame count number. Each of the count numbers is coded in binary-coded decimal notation using a modified NRZ modulation method. A more complete description of the encoding waveforms and timing a the standard VITC code is given in the SMPTE Journal, September 1981 which description is hereby incorporated by reference.

Figure 2:
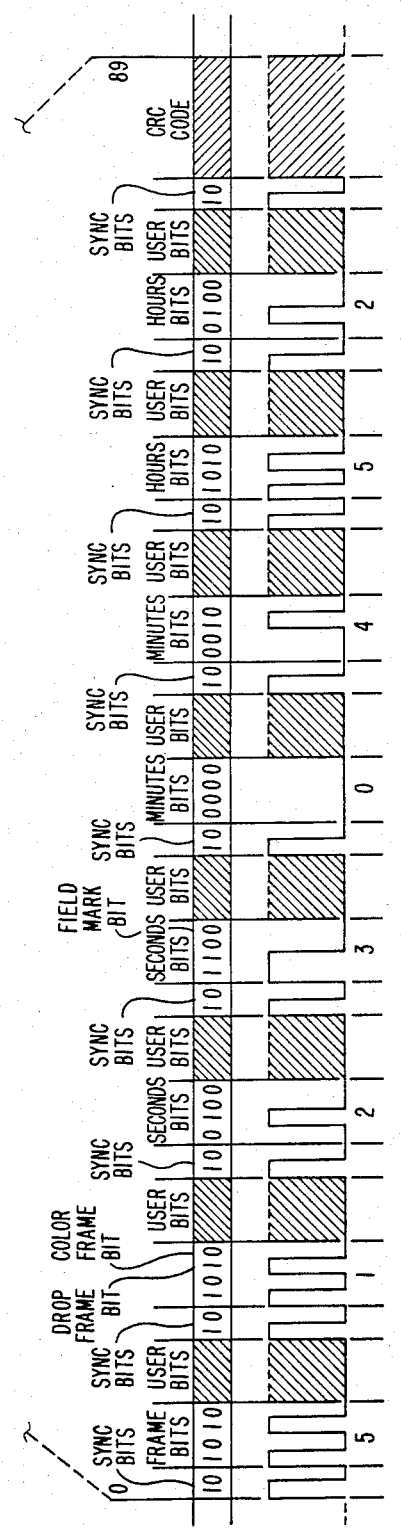
FIG. 2 is an illustrative VITC signal as recorded on a length of magnetic tape.

FIG. 2 shows an expanded view of the actual structure of the code numbers as recorded on a section of video magnetic tape. For synchronization purposes, a fixed synchronization pattern (consisting of a digital "1" followed by a digital "0") is periodically encoded on the tape at ten bit intervals. Located between the synchronization bit patterns are a group of information bits recorded in a predtermined pattern which specify the address numbers followed by a group of bits which may be specified independently by the user.

The section of magnetic tape shown in FIG. 2 contains an encoded address corresponding to 25 hours, 40 minutes, 32 seconds and 15 frames. Accordingly, the first four address bits shown on the left following an initial synchronization pattern are encoded with the binary coded decimal for five ("1010").

Four user bits follow the frame bits which are, in turn, followed by a pair of synchronization bits. Since, according to convention, there can be no more than 30 frames (numbered 0-29) only two bits are necessary to encode the most significant bit of the frame address number. In FIG. 2 this bit is encoded as a 1. One of the remaining two bits of the four bit frame address field is used for a "drop frame" bit which is used to indicate whether, during a continuous recording, certain address numbers are omitted from a continuous chain of addresses in order to resolve a timing difference due to the manner of processing color television signals.

The other bit of the frame address number is used for the "color field" bit which is used to convey information regarding the encoding of color information in the signal.

The drop frame bit and color field bit are followed by a group of four user bits and two sync bits, respectively. The remaining least significant and most significant bits of the seconds code, minutes code or hours code are recorded similarly. Since the most significant bit of the seconds number cannot be greater than 5 only three bits are used to encode this information. The remaining bit of the four bit group is used to record the field code bit which indicates the field of the specified frame into the code is inserted (a "0" is inserted into this location when the code is located in the first field and a "1" is inserted for the second field).

The actual address code information including the user specified bits ends with the eigth user's bit group including bit number 79. Bits 80 and 81 are synchronization bits in the standard "10" pattern. Bits 82-89 are encoded with a cyclic redundancy check (CRC) code that is a standard error detecting code that is generated by well-known circuitry.

Figure 3:
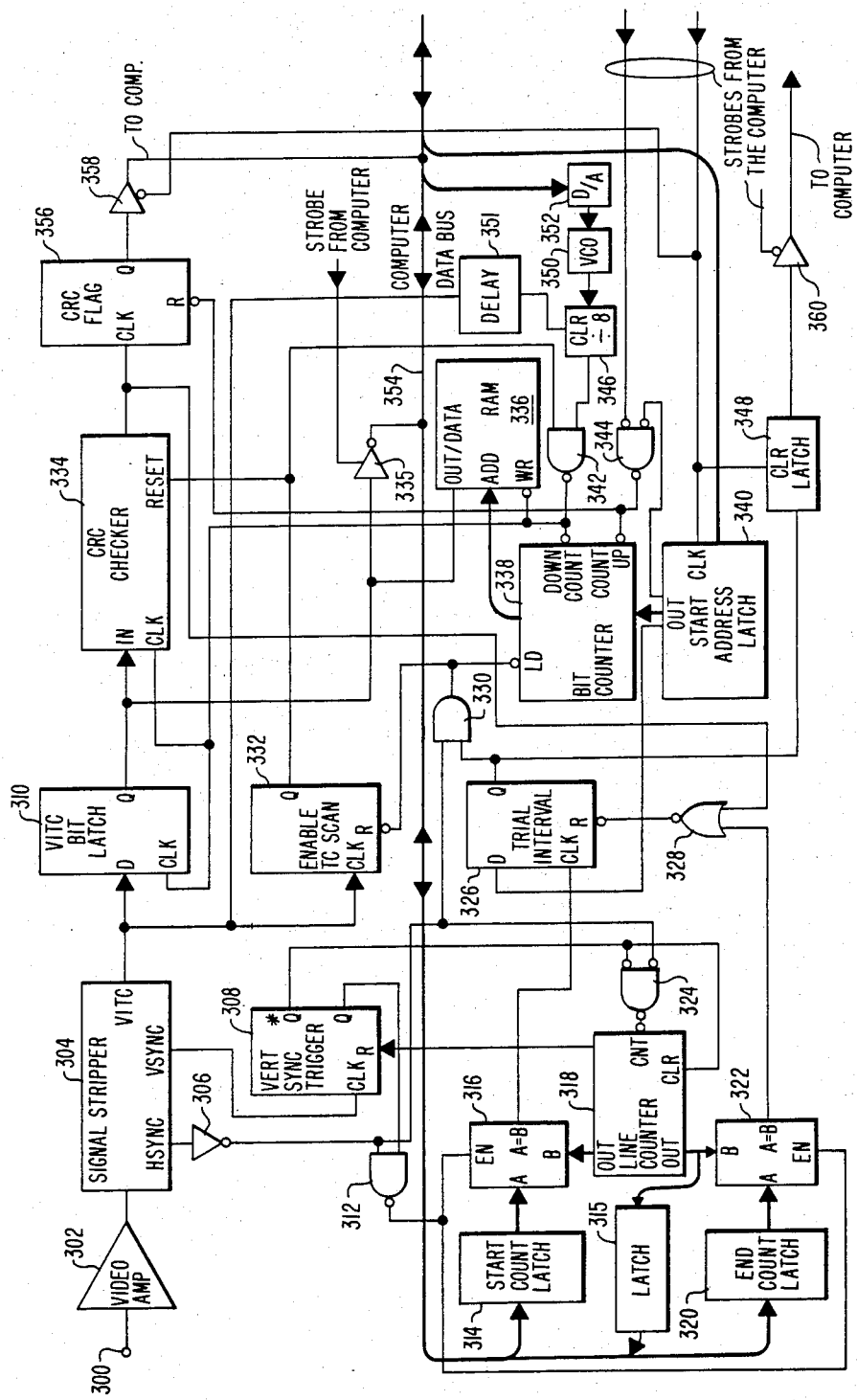
FIG. 3 is a block diagram the inventive VITC signal decoding apparatus.

FIG. 3 of the drawing is a detailed block diagram of illustrative reader circuitry which is used to decode the signal generated from the magnetic tape as the tape is run at various speeds, including fast-forward, rewind, normal playback speeds or stopped. The decoding circuitry is controlled and coordinated by a computer (not shown) by means of information placed on data bus 354 and associated command leads. Although bus 354 is shown as a single line, it actually consists of eight signal lines which are bi-directional to allow commands to be issued from the computer and provided to the circuitry and to allow data generated by the circuitry to be forwarded to the computer.

In accordance with the invention, the computer controls the frequency of a local oscillator in the decoding circuitry to search in a predetermined pattern for a decoding clock rate which will allow proper reception of the VITC signals even though the video magnetic tape recorder may be running at normal playback speed, rewind speed or fast-forward speed. In particular in order to properly decode a VITC signal, the decoding circuitry must first locate the horizontal lines in which the VITC signal is recorded. After the proper group of lines is located, the incoming signals in the line must be sampled by the local oscillator which is synchronized to the signal in order to obtain the VITC information. During the sampling operation the incoming signals must be stored so that the encoded information can be used if it has been received properly. Finally, the received signal must be checked to insure that it has been received properly. If the incoming VITC information has not been received properly the local oscillator frequency must be changed and the decoding operation started again.

Accordingly, the circuitry shown in FIG. 3 has five main parts. The first part consists of the circuitry which is used to separate the horizontal and vertical sych signals and the VITC code from the composite video signal produced from the tape recorder read head.

Specifically, video signals generated by the read head of the video magnetic tape recorder (not shown) enter the decoding circuitry via terminal 300 and are provided to video amplifier 302 which is a well-known electronic circuit which amplifies the signals to provide sufficient signal strength to operate the remainder of the circuitry. The amplified video signals are provided from the output of video amplifier 302 to signal stripper 304. Stripper 304 contains well-known analog circuitry which filters the amplified signals to removed the 3.58 megahertz color burst signals and other unwanted high frequencies, clamps the circuit to restore the D.C. level and separates the VITC signal, horizontal sync pulses and the vertical sync pulses. The VITC signal is generated at the VITC output of stripper 304 and short positive pulses are provided at the horizontal and vertical sync outputs upon reception of the appropriate sync signal.

Since the VITC code can be located on any horizontal line from lines 10 through 20 it is necessary for the reader circuitry to search over the lines within the given range in order to determine on which lines the VITC code is located. The second main part of the decoding circuitry including latches 314, 315, and 320 and line counter 318 performs this function.

In particular, for convenience, the decoding circuitry can be user-programmed to search over a predetermined horizontal line range including lines 10–20. In order to set the desired range, the user sets the beginning line number and the ending line number of the range on rotary switches which communicate the range information to the computer. The computer then digitizes the starting and ending values and controls the decoding circuitry to search from the starting value to the ending value for the VITC code.

More particularly, the computer loads the starting line count into latch 314 and the ending line count into latch 320 by placing the information on data bus 354 and generating a control pulse on leads (not shown) connected to latches 314 and 320.

The output of start count latch 314 is provided to one input of bit-by-bit comparator 316; similarly, the output of end count latch 320 is provided to one input of bit comparator 322. Comparators 316 and 322, when enabled, compare the counts stored in latches 314 and 320 to the output of line counter 318. Comparators 316 and 322, in turn, are enabled by timing circuitry controlled by the sync outputs of signal stripper 304. In particular, the vertical sync signal generated by stripper 304 is used to clock sync trigger flip/flop 308. Since the VITC code cannot occur before the vertical synchronization signal has been received, the outputs Q and Q* of flip/flop 308 are used to initiate and control the operation of the decoding circuitry.

The Q output of flip/flop 308 is applied to one input of NAND gate 312 and gate 312 is thus enabled after a vertical sync pulse has been received and has "set" flip/flop 308. The other input of NAND gate 312 is provided with an inverted timing pulse generated upon reception of a horizontal sync pulse produced by inverter 306. Due to inverter 306, NAND gate 312 will inhibit comparators 316 and 322 until the end of the horizontal sync pulse when the output of stripper 304 becomes "high". This inhibition allows line counter 318 to settle and prevents false operation.

Line counter 318 is incremented by gate 324 which is, in turn, enabled when flip/flop 308 is "set" by a vertical sync pulse, as previously described. In particular, "set" flip/flop 308 applies a "low" signal to the upper input of gate 324 from its Q* output. The lower input of gate 324 is connected to the output of inverter 306 and thus counter 318 is incremented at the end of each horizontal sync pulse.

Accordingly, during each horizontal interval, counter 318 is incremented and then comparators 316 and 322 are enabled to compare the incremented line count to the starting and ending line count numbers stored in latches 314 and 320. Operation continues in this manner until the output of counter 318 equals the start count stored in latch 314. When this occurs, comparator 316 applies a clocking signal to clock trial interval flip/flop 326.

The response of flip/flop 326 to the clocking signal depends upon the signal applied to its D input from start address latch 340. Start address latch 340 is loaded by the computer, via data bus 354, and contains an address which, as will hereinafter be described, is used to address random access memory 336 and control bits. The control bit is used by the microcomputer to indicate that it is not processing time code information and instead is expecting the decoding circuitry to perform a time code "scan". Normally this bit is set to a "1" to start the scanning operation in the circuitry shown in FIG. 3.

The "1" or "high" signal is applied, via lead 329, to the D input of flip/flop 326. Accordingly, when a clock signal is received from the output of the comparator 316, flip/flop 326 is "set" indicating that the starting line count has been reached and the circuitry is ready to process incoming code signals for each succeeding line until the ending line count is reached.

The next major portion of the circuitry is the decoding circuitry which receives and decodes the incoming VITC code. This circuitry consists of VITC latch 310 and a variable frequency oscillator consisting of D/A converter 352, voltage controlled oscillator 350 and divider 346.

Specifically, when flip/flop 326 is "set" by the line counter circuitry as previously described, the "high" signal at its Q output is provided to AND gate 330, enabling it. Gate 330 is thereby controlled via the output of inverter 306 and the horizontal output of signal stripper 304. In particular, during a horizontal sync pulse, as previously described, a "high" signal is produced from stripper 304 which is inverted by inverter 306 and applied to the left input of AND gate 330. Gate 330, thereupon, applies a "low" signal to the reset input of flip/flop 332 resetting it. At the end of the horizontal sync pulse, inverter 306 produces a "high" signal which enables AND gate 330, removing the resetting signal from flip/flop 332.

Flip/flop 332 is used to start the checking of the incoming video information for the VITC code. While in the reset state it provides a "low" signal at its Q output which is applied to CRC checker 334 resetting it so that it can begin checking the incoming code, as will be hereinafter described. Flip/flop 332 is "set" by the leading edge of the first VITC signal received from signal stripper 304 and the "high" signal at the Q output of "set" flip/flop 332 is applied to NAND gate 342 to enable it, which as will hereinafter be described, enables clock pulses produced by the programmable clock to be applied to the down count input of bit counter 338. In addition "set" flip/flop 332 removes the low signal from the reset input of CRC checker 334 enabling it to begin checking incoming VITC signals.

VITC signals are also provided to the D input of latch 310. Latch 310 is controlled to sample the VITC signals by the output of gate 342 which is, in turn, controlled by a programmable clock consisting of D/A converter 352, voltage controlled oscillator 350 and divide by eight counter 346.

In accordance with one aspect of the invention, the computer sets the decoding frequency of the oscillator by means of D/A converter 352 in accordance with a predetermined scheme, as will hereinafter be described. In order to set the decoding frequency, the computer provides an 8-bit command word to D/A converter 352 over data bus 354. D/A converter 352 is a well-known device which provides an analog output corresponding to signals received as digital inputs. The analog output is a voltage which is applied to voltage controlled oscillator 350 and the frequency of oscillator 350 is thereby controlled in accordance with the data word applied to D/A converter 352.

In particular, oscillator 350 is controlled to oscillate at eight times the expected bit rate of the VITC information. The output of oscillator 350 is applied to divide-by-eight counter 346 which thereupon applies clock pulses to NAND gate 342 at the expected bit rate. Counter 346 is synchronized to the incoming VITC information by means of delay 351. In particular, the first rising edge of the VITC information which clocks flip/flop 332 also, after a short delay introduced by delay 351, resets counter 346.

After being synchronized, counter 346 begins counting and after eight counts its output becomes "low" disabling NAND gate 342. The output of NAND gate 342 thereupon becomes "high", clocking latch 310 and latching the first VITC bit into the system. In addition, the "high" signal produced by gate 342 clocks CRC checker 334 to begin processing the first received VITC bit.

CRC checker 334 is the fourth main part of the decoding circuitry and is a well-known circuit which checks the incoming code to be sure it has been properly received. It may be implemented in the conventional fashion using a shift register with exclusive OR gate feedback. The output of CRC checker 334 becomes "high" if the enitre VITC signal word has been properly received.

In accordance with the invention as will hereinafter be described, the output of CRC checker 334 is used by the computer to determine whether or not the proper decoding frequency has been used. In particular, the computer selects a decoding frequency which causes error-free reception of the VITC signal. If an error is detected, as indicated by a "low" output of CRC checker 334, then the computer executes a predetermined sequence, selecting various frequencies until an error-free reception of the VITC signal is obtained.

The fifth and final portion on the decoding circuitry is the temporary storage circuitry which is used to store the incoming VITC bits until a determination is made whether the code has been received correctly. The storage circuitry consists of address latch 340, bit counter 338 and RAM 336.

In particular, the "low" signal produced by enable flip/flop 332 when it is in the reset state is also applied to the load input of bit counter 338 causing it to load information contained in latch 340. Prior to starting a decoding trial, the computer loads a starting address for RAM 336 into latch 340 via data bus 354. The starting address specifies a location at which the incoming information is to be temporarily stored.

After the first VITC bit has been strobed into latch 310 by a "low" signal at the output of divider 346, one-half bit time later the output of divider 346 goes "high" enabling gate 342. Gate 342, thereupon, applies a "low" signal to its output which "low" is applied to the write input (WR*) of RAM 336. The output of latch 310 containing the first received VITC bit is thereby written into the starting address loaded into bit counter 338. In addition, the "low" output of gate 342 is applied to the down count input of bit counter 338 causing it to decrement to a new address.

The storing process is repeated for each new incoming VITC bit until 82 bits have been stored in RAM 336. The circuitry then begins processing the next eight CRC check bits. If all 90 bits have been received correctly a "1" signal will be present at the output of CRC checker 334. This "high" signal clocks CRC flag flip/flop 356 in order to inform the computer that the VITC code has been correctly received. The output of CRC flip/flop 356 can then be examined by the computer by strobing driver 358 which output is provided via computer data bus 354 to the computer to indicate that a VITC code has been properly received.

The "high" signal at the output of CRC checker 334 is also applied to NOR gate 328 causing trial interval flip/flop 326 to be "reset". When flip/flop 326 has been reset a high-to-low transition occurs at its Q output which clocks latch 348 indicating that the trial has been completed. The output of latch 348 is applied to driver 360 which can also be strobed by the computer to check whether the trial scan has been completed.

When a trial has been completed the output of line counter 318 can also be gated onto bus 354 by means of latch 315 so that the computer can store the line number on which a VITC code was properly received.

If a VITC code is not properly received by the end of the horizontal line scan, a horizontal sync pulse appearing at the output of stripper 304 causes a "low" signal to be applied by inverter 306 to AND gate 330 which resets TC scan flip/flop 332. Flip/flop 332, thereupon, applies a "low" signal to the reset input of CRC checker 334 resetting it in preparation for receiving a new VITC code. In addition, NAND gate 342 is disabled by flip/flop 332, thereby preventing counter 338 from being decremented. At the end of the horizontal sync pulse TC scan flip/flop 332 is again enabled to begin the next scanning operation.

Operation continues in this manner until either a VITC code is properly received or until line counter 318 reaches the end line count stored in latch 320 at which time comparator 322 generates a "high" signal which signal is applied to NOR gate 328 causing it to reset trial interval flip/flop 326. Reset flip/flop 326 applies a "low" signal to AND gate 330 disabling it and causing the TC scan flip/flop 332 to remain reset thereby ending the decoding of VITC information.

After the computer has determined that a VITC code has been properly received by reading the output of latches 348 and 356 it thereupon, reads the data stored in RAM 336 in order to further process the stored VITC code.

In particular, the computer stores an address and control word in start address latch 340 including a control bit which is a "0". This "low" signal is applied to the lower input of gate 344, enabling the gate. The computer then applies a "low" strobe signal to the upper input of gate 334 which thereupon applies a "low" signal to the count-up input of counter 338. The "low" signal at the output of gate 344 is also applied to the reset input of CRC flag 356 to reset it.

Under control of gate 344, counter 338 increments the address signals applied to RAM 336. Since the write (WR*) input of RAM 336 is held "high" by the output of disabled gate 342, the data stored in the location addressed by the output of bit counter 338 is applied to the out/data lead of RAM 336 and, via driver 335, to data bus 354. Each successive strobe signal applied to gate 344 increases the count of bit counter 338 addressing a new address which is read out via driver 335 to the computer.

As previously explained, the operations of the illustrative VITC code reader is controlled and coordinated by a computer. A computer suitable for use with the illustrative embodiment is a model Z-80 microcomputer manufactured by Zilog Incorporated, Cupertino, Calif.

In accordance with one aspect of the invention, under control of a software program, this computer performs a predetermined routine which adjusts the decoding frequency of the local programmable oscillator until an error-free reading of the VITC signal is received from the reader circuitry.

In particular, the computer monitors the incoming VITC information to detect errors in reception which might indicate an incorrect decoding clock rate. However, since reception errors could also be caused by a number of factors, including noise, to avoid erroneously readjusting the decoding clock rate due to a distrubance caused by noise, before readjusting the clock rate the computer makes six attempts to receive a VITC signal within the specified line range.

If the VITC signal is incorrectly received on all six attempts, the computer then sets the decoding clock rate to a rate corresponding to normal playback speed. If this clock rate does not produce an error-free reading of the VITC code, the last clock rate is incremented by 2% and used as a new clock rate. If the new clock rate still produces reading errors, the last clock rate is decremented by 2%. Next, the last clock rate which is known to have worked is tried. If there is still no valid reading the clock rate is incremented by 4% and then subsequently decremented by 4%. Operation continues in this fashion until the VITC code is received error-free or predetermined limits on the incremented rate and decremented rate are reached at which point a clock rate for the last speed known to have worked is used alternating with the clock rate corresponding to normal playback speed.

Figure 4:
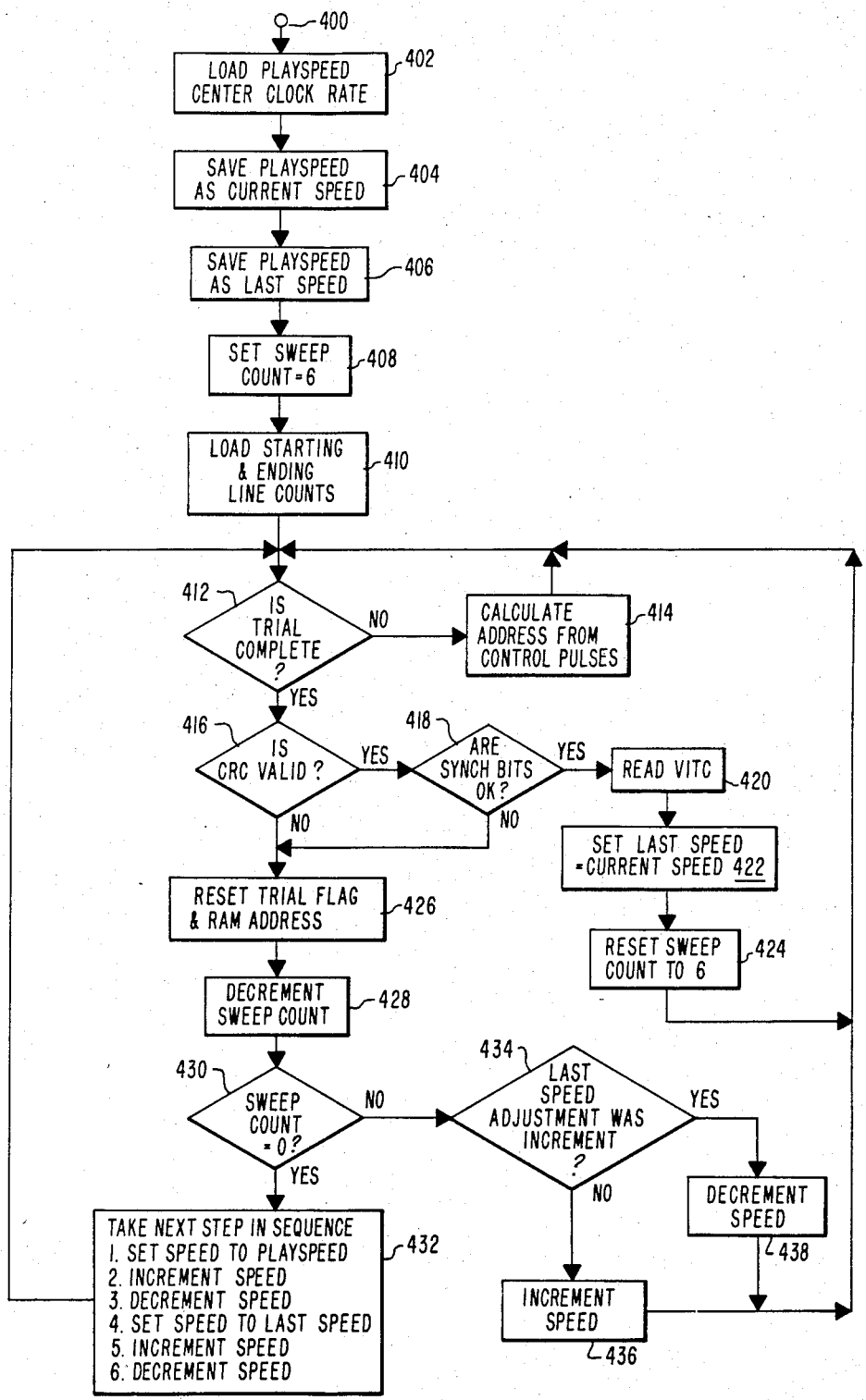
FIG. 4 is a flow chart of the sequence of steps used to in which that local oscillator is adjusted to obtain proper decoding of the VITC signal.

A flow chart for the program which performs the decoding clock adjustment is shown in FIG. 4. Other adjustment routines could also be used, but the routine shown is preferred with the illustrative embodiment. Starting at point 400 the first five steps are used to initialize the decoding circuitry to start a trial decoding of the VITC code. In particular, as shown in step 402, a clock rate corresponding to the center frequency of the expected playback speed is loaded into an appropriate register in the computer. This playspeed clock rate is a fixed clock rate related in a well-known manner to the horizontal scanning rate.

In step 404 the clock rate corresponding to the play speed loaded in step 402 is loaded into the "current speed" register to be saved. In step 406 the "last speed" register is also loaded with clock rate corresponding to the play speed.

In step 408 a "sweep counter" is set to an initial value of six. This counter determines the number of errors which can be received before the clock rate is automatically adjusted by the computer.

In step 410, the computer next loads the starting and ending line counts into the appropriate latches in the decoding circuitry which count numbers are obtained, as previously described, from switches set by the user.

In step 412 the computer monitors the output of the trial latch (latch 348 in FIG. 3) to determine whether a trial attempt at decoding the VITC pulses using the playspeed clock rate has been completed. If the trial has not been completed the computer proceeds to step 414 and calculates address information from control pulses obtained from the tape recorder.

If a trial has been completed, the computer proceeds to step 416 in which it enables driver 358 (FIG. 3) to check the output of the CRC flag flip/flop 356. If the CRC flag flip/flop indicates that the VITC code has been received properly then the computer proceeds to step 418 in which it reads in the synchronization bits from RAM 336 in a manner previously described and checks them against a fixed synchronization bit pattern. A proper synchronization bit code causes the entire VITC code to be read in to the computer, as shown in step 420. Since the trial has resulted in an error-free reading of the VITC code in step 422 the computer sets the clock rate corresponding to the last speed equal to the current speed and in step 424, the sweep counter is reset to the initial value of six. The computer then returns to step 412 and performs another trial reading of the VITC code.

If, on the other hand when the CRC code is checked in step 416, an error is found, the computer proceeds to step 426 in which the trial flag flip/flop is reset and the RAM address (stored in latch 340 in FIG. 3) is reset. In step 428 the computer decrements the sweep counter by 1 to indicate that one error has been received.

In step 430 the computer checks to see whether the sweep counter is 0 which occurs when six errors have been received. If the sweep count is not zero, the computer proceeds to step 434 in which the clock rate for the current speed is changed slightly to ensure that reception errors are not being caused by a clock rate which is nearly correct but causes borderline reception. In particular, as shown in step 434, if the last speed adjustment was an increment, the speed is decremented by 2% as shown in step 438. Alternatively, If the last speed adjustment was not an increment than the speed is incremented by 2% as shown in step 436. In either case the computer proceeds back to step 412 and makes another trial.

If six errors in a row are received, as indicated by the sweep count equaling 0 in step 430, the computer proceeds to step 432 in which it takes a succeeding step in the sequence shown. Each pass through the decoding loop resulting in a reception error causes the computer to advance to the next step of the six steps shown. In particular, the first pass through the decoding loop causes the computer to set a clock rate corresponding to playspeed. Next, the current clock rate is incremented by 2%, then decremented by 2%. The next pass through the loop caused by an error causes the computer to set a clock rate corresponding to the last speed known to have produced an error-free reading. The current clock-rate is then incremented by 4% and decremented by 4%. Subsequently, the playspeed clock rate is tried again and then the clock rate is incremented by 6% and decremented by 6%. This operation continues until an error-free reading is obtained or set limits on the incremented and decremented clock rates are reached. When the limits have been reached, clock rates corresponding to the playspeed and last known good speed are alternated.

Although only one illustrative embodiment of the invention is disclosed herein other changes and modifications within the spirit and scope of the invention will become apparent to those skilled in the art, which changes and modifications are intended to be covered by the claims herein.

What is claimed is:

1. In apparatus for reading coded information recorded on video magnetic tape, said apparatus having means for reading signals from said tape as said tape is run through said apparatus at different speeds, a local oscillator for generating sampling signals at various frequencies, means responsive to said sampling signals for sampling said signals read from said tape to produce received information, the improvement comprising, means responsive to the data content of selected portions of said received information read from said tape for adjusting the frequency of said sampling signals to produce error-free reception of said information.

2. In apparatus for reading coded information recorded on magnetic tape, the improvement according to claim 1 wherein said adjusting means comprises means for recording a coded data pattern on said tape in addition to data signals, means responsive to said sampling signals for reading data from said tape, said data including said coded pattern, means responsive to said coded data signal read from said tape for changing the frequency of said sampling signals to produce error-free reception of said coded data information.

3. In apparatus for reading coded information recorded on magnetic tape, the improvement according to claim 2 wherein said changing means comprises means responsive to said coded data signal read from said tape and to said original coded data signal for changing the frequency of said sampling signals until said coded data signal read from said tape and said original coded data signal are equal.

4. In apparatus for reading coded information recorded on magnetic tape, the improvement according to claim 2 wherein said recording means computes said coded data pattern from said data signals.

5. In apparatus for reading coded information recorded on magnetic tape, the improvement according to claim 4 wherein said changing means comprises means responsive to data read from said tape for recomputing said coded data signal and means responsive to said coded data signal read from said tape and to said recomputed coded data signal for changing the frequency of said sampling signals until said coded data signal read from said tape and said recomputed coded data signal are equal.

6. In apparatus for reading coded information recorded on magnetic tape, the improvement according to claim 2 wherein said coded data pattern is a predetermined pattern.

7. In apparatus for reading coded information recorded on magnetic tape, the improvement according to claim 6 wherein said coded data pattern is computed from said data signals by a predetermined formula.

* * * * *